(12) United States Patent
Yasuoka

(10) Patent No.: US 6,272,638 B1
(45) Date of Patent: *Aug. 7, 2001

(54) INFORMATION PROCESSING DEVICE AND ELECTRIC DEVICE

(75) Inventor: Miyuki Yasuoka, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,921

(22) Filed: Feb. 2, 2000

Related U.S. Application Data

(63) Continuation of application No. 08/765,352, filed on Jun. 5, 1997.

(30) Foreign Application Priority Data

May 2, 1995 (JP) ................................... 7-108856

(51) Int. Cl.⁷ ................................................ G06F 11/30
(52) U.S. Cl. ..................... 713/200; 380/251; 380/258; 463/29
(58) Field of Search ................ 713/200; 463/29, 463/43, 44; 711/163; 380/251, 258

(56) References Cited

U.S. PATENT DOCUMENTS

| 5,592,651 | * | 1/1997 | Rackman | ............................. 395/490 |
| 5,812,980 | * | 9/1998 | Asai | ......................................... 705/1 |
| 6,035,400 | * | 3/2000 | Yasuoka | ............................... 713/200 |

FOREIGN PATENT DOCUMENTS

| 3-266051 | 11/1991 | (JP) . |
| 5-210497 | 8/1993 | (JP) . |
| 6-46179 | 2/1994 | (JP) . |
| 7-85060 | 3/1995 | (JP) . |
| 7-234784 | 9/1995 | (JP) . |

OTHER PUBLICATIONS

Anonymous, "Methodology to Prevent Vidoe and Software Piracy", IBM Technical Disclosure Bulletin, vol. No. 36, iss. No. 10, pp. 199–200, Oct. 1993.*

Anonymous, "Automated Configuration for Country Specific Software Packages", IBM Technical Disclosure Bulletin, vol. No. 36, iss. No. 10, pp. 379–380, Oct. 1993.*

Anonymous, "Mechanism to Automate National Language Configuration", IBM Technical Disclosure Bulletin, vol. 36, No. 9b, Sep. 1993, New York, US; pp. 113–114.

European Search Report dated Jun. 12, 1998.

* cited by examiner

Primary Examiner—Robert Beausoleil
Assistant Examiner—Scott T. Baderman
(74) Attorney, Agent, or Firm—Dickstein Shapiro Morin & Oshinsky LLP

(57) ABSTRACT

An information processing device 10 comprises a ROM 12 which stores a reference code indicative of a predetermined area, a site code forming unit 14 which forms a site code of a measuring point, based on position measuring data "a" given by a global positioning system, and a comparison unit which compares the reference code stored in the ROM 12 with the site code formed by the site code forming unit 14 and outputs an actuation signal based on comparison result. A game device including the information processing device 10 can control a game corresponding to an area, based on a site code indicative of a current position, a measuring point.

7 Claims, 5 Drawing Sheets

INFORMATION PROCESSING DEVICE AND ELECTRIC DEVICE

This is a continuation of application Ser. No. 08/765,352 filed on Jun. 5, 1997.

TECHNICAL FIELD

The present invention relates to an information processing device using a global positioning system (hereinafter called GPS), and an electric device comprising the information processing device, more particularly to an information processing device which discriminates measured position information from a GPS to actuate or control various electric devices, and an electric device comprising the information processing device.

BACKGROUND ART

Conventionally, in order to sell one kind of products in a plurality of areas, especially in various countries, it is necessary to make changes to the products to make them fit to environments of the areas and the countries.

For example, in a program used in an electric device including image display, it is necessary that language information which is displayed in images by the program is replaced by language information of a country to which the program will be sold. In Japan, where the domestic a.c. electric source has the 50 Hz area and the 60 Hz area, various means are taken, e.g., a specification of a domestic electric product is partially changed in accordance with an area where the electric product is sold, are made fit to language information of the country, are made usable in both areas.

External memory devices, such as game cartridges, etc., sold in a certain area are sold at proper prices in the area. For example, the sale price of one external memory device is different between Japan, and countries other than Japan, e.g., North America and Southeast Asia. This makes a malicious third party other than a sale company of external memory devices to buy them in countries where prices are lower and sell them in countries where prices are higher so as to get great profit. This makes it also possible for a third party other than a sale company to buy external memory devices which have been already sold in a country to buy them in the country and sell them in countries where the external memory devices are not yet sold so as to unduly get great profit. In view of these circumstances, it is preferred that an external memory device fabricated in consideration of local characteristics of an area is prevented from operating in areas other than the intended area.

To this end, a vide game machine or others in which are used external memory devices storing game programs for controlling progress of the games have been made operative only in an intended area by the following means.

A first area code indicative of a sale area is in advance stored in a memory unit of the body of a video game machine. On the other hand, a second area code indicative of a the sale area is stored in an external memory device to be used in the video game machine. The external memory device stores a plurality of game programs which correspond to a plurality of different sale areas, and a plurality of second area codes. The external memory device mounted on the video game machine is checked by a check program incorporated in the video game machine before the start of the game program or in the progress of the game program.

The checking selects a second area code which agrees with the first area code, and the game program alone corresponding to the second area code is executed as a game program for the sale area.

However, in a case that local needs become diverse, or an external memory device is sold in more countries, disadvantageously this means cannot work only by providing area codes to respective countries.

Such vide game machines, etc. must store different area codes corresponding to respective countries. This leads to a disadvantage of costs increase, ill inventory, etc. of the video game machines unless correct sales estimates, actual sales, etc. of respective countries can be grasped.

Furthermore, this means also has a disadvantage that in a case that an area code of an area is stored as a fixed value in the body of the video game machine, it is impossible to later subdivide the area code. That is, at the beginning of sale of the video game machine, one area code is given to an area including a plurality of areas, and even in a case that under later changed circumstances, operations of game programs must be controlled in accordance with said plurality of areas, this means cannot meet such situation.

One object of the present invention is to provide an information processing device which can make control in accordance with an area.

Another object of the present invention is to provide an electric device comprising the information processing device which can make control in accordance with an area.

Further another object of the present invention is to provide a game device comprising the information processing device which can make control in accordance with an area.

DISCLOSURE OF THE INVENTION

The information processing device according to the present invention is characterized in comprising: a reference code storing unit which stores a reference code indicative of a predetermined area; a site code forming unit which, based on position measuring data obtained by a global positioning system, forms a site code at a measuring point; and a comparison unit which compares the reference code stored in the reference code storing unit with the site code formed by the site code forming unit to output a comparison result. Thus the control can be conducted, based on a result of comparison between a site code indicative of a current position, a measuring position and a reference code.

The information processing device according to the present invention is characterized in comprising: a site code forming unit which, based on position measuring data obtained by a global positioning system, forms a site code at a measuring point; and a control unit which outputs a predetermined control signal based on the site code formed by the site code forming unit. Thus, the control can be conducted corresponding to respective areas, based on site codes indicative of a current position, a measuring point.

The information processing device according to the present invention may further comprise a site code storing unit which stores and retains the site code formed by the site code forming unit. Thus, the site code storing unit can be rewritten, whereby improper export to other areas other than a proper area can be prohibited.

The information processing device according to the present invention may further comprise a holding power source which holds memory of the site code storing unit; and an operational power source which operates the global positioning system which provides the position measuring data. Thus, a site code which the receiving unit has finally received can be held by the site code storing unit, whereby the control can be conducted, based on a result of comparison between the site code and a reference code even indoors where the receiving condition is not good.

The information processing device according to the present invention may further comprise a code judging unit which judges whether or not the site code formed by the site code forming unit is proper, and writes the site code in the site code storing unit only when a judgement result is proper. Thus, when the receiving unit is not in good receiving condition, it can be prevented to write an improper site code in the site code storing unit, so that erroneous operation can be prohibited.

The game device according to the present invention is characterized in that the electric device comprises the above-described information processing device, and that the electric device conducts a predetermined control, based on a comparison result outputted by the information processing device. Thus, it is not necessary to prepare different electric devices for respective corresponding areas.

The game device according to the present invention is characterized in that the game device comprises the above-described information processing device, and that the game device is actuated when a comparison result outputted by the information processing device is that the reference code and the site code agree with each other. Thus, improper use of the game device in areas other than a proper area based on a reference code stored in the information processing device can be prohibited.

In the game device according to the present invention it is possible that a game program and the reference code are stored in an external storage device to be mounted on the game device; that the comparison unit of the information processing device compares the reference code stored in the external storage device with the site code formed by the site code forming unit; and that the game device comprises a game control unit which executes the game program, based on a comparison result given by the comparison unit. Thus, improper use of the external storage device in improper areas other than a proper area based on a reference code stored in the external storage device can be prohibited.

In the game device according to the present invention, it is possible that the external storage device further stores a plurality of area codes, and a plurality of special programs associated with said plurality of area codes; that the comparison unit of the information processing device compares the site code with said plurality of area codes; and that the game control unit executes the game program and/or said plurality of special programs, based on a comparison result of the comparison unit. Thus, a game program can be executed corresponding to an area.

In the game device according to the present invention, it is possible that a plurality of area codes and a plurality of special programs associated with said plurality of area codes in an external game device to be mounted on the game device; that the comparison unit of the information processing device compares the site code with said plurality of area codes; and that the game control unit executes the game program and/or said plurality of special programs, based on a comparison result of the comparison unit. Thus, a game program can be executed corresponding to an area.

The electric device according to the present invention is characterized in that the electric device comprises the above-described information processing device; that the electric device conducts a predetermined control, based on a control signal outputted by the information processing device. Thus, the control can be conducted corresponding to areas.

In the electric device according to the present invention, it is possible that the control signal outputted by the information processing device is an operation permitting/non-permitting signal which permits or does not permit operation of the electric device. Thus, operation of the electric device can be restricted corresponding to areas.

In the electric device according to the present invention, it is possible that the control signal outputted by the information processing device is a frequency control signal which control a frequency of a power source used by the electric device. Thus, a frequency of the electric source used of the electric device can be automatically switched.

BEST MODE FOR CARRYING OUT THE PRESENT INVENTION

Figure 2:
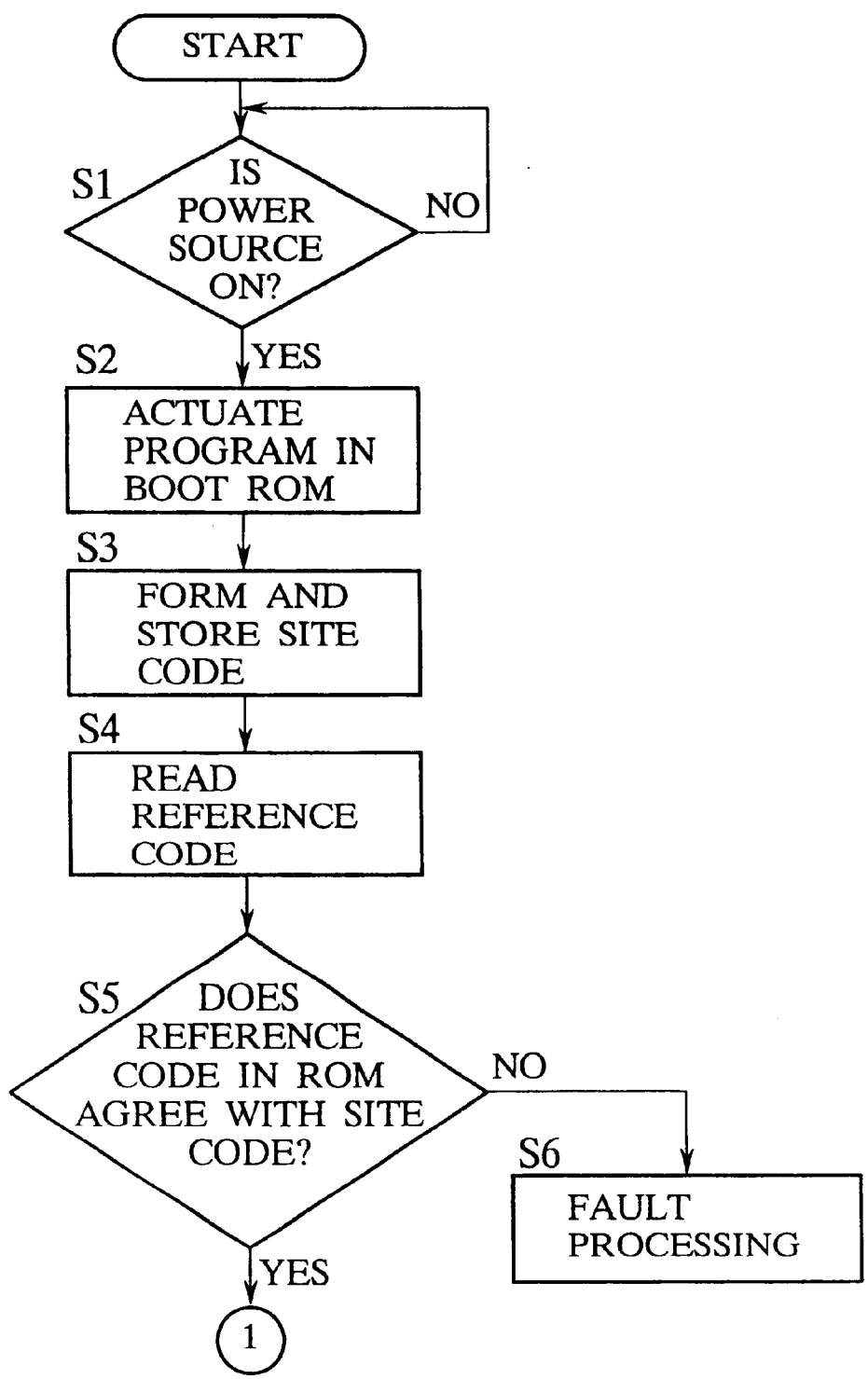
FIG. 2 is a flow chart (Part 1) of the operation of the video game machine according to the first embodiment of the present invention at the time of actuation thereof.
Figure 3:
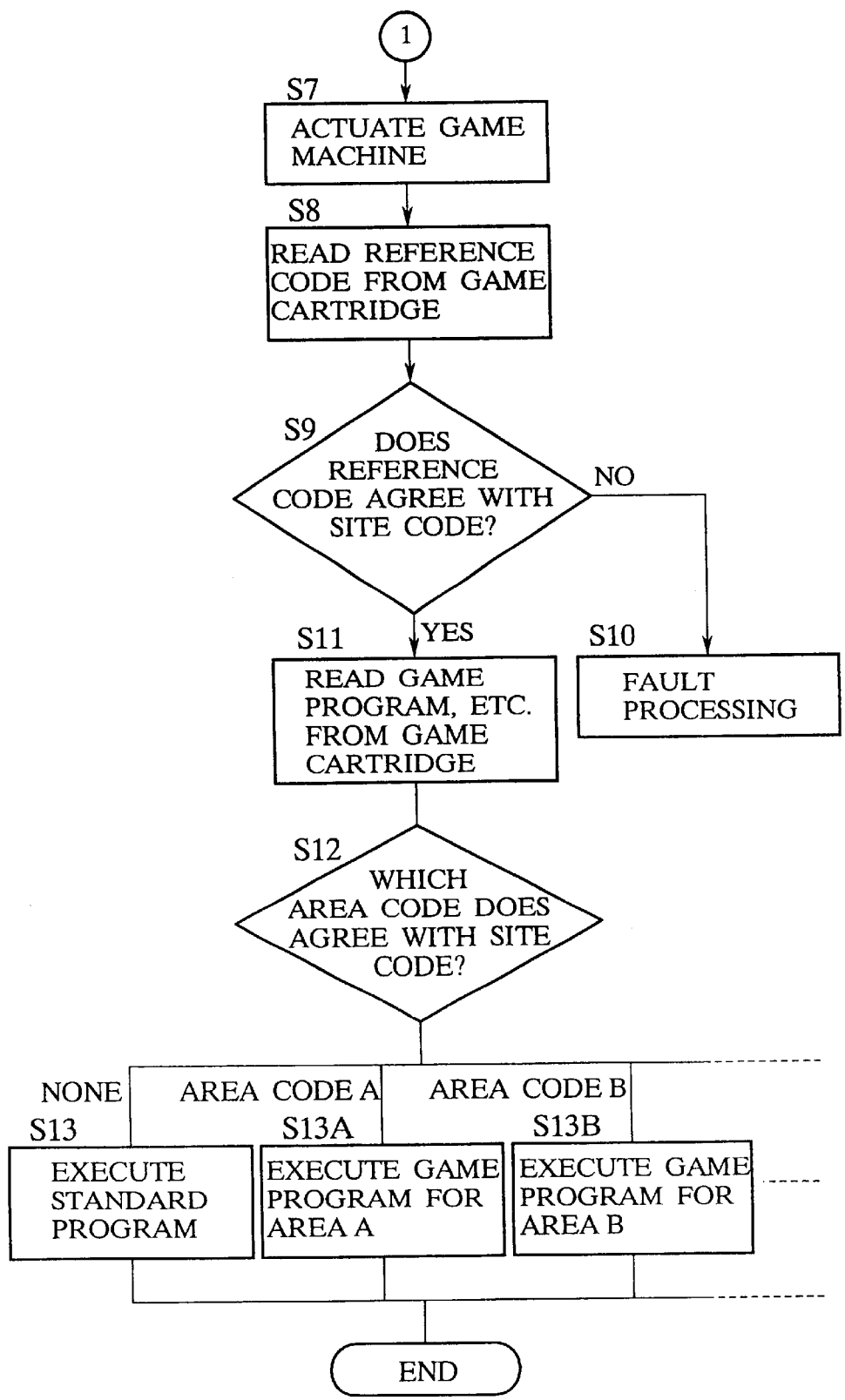
FIG. 3 is a flow chart (Part 2) of the operation of the video game machine according to the first embodiment of the present invention at the time of actuation thereof.

The information processing device according to a first embodiment of the present invention will be explained with reference to FIGS. 1 to 3.

Figure 1:
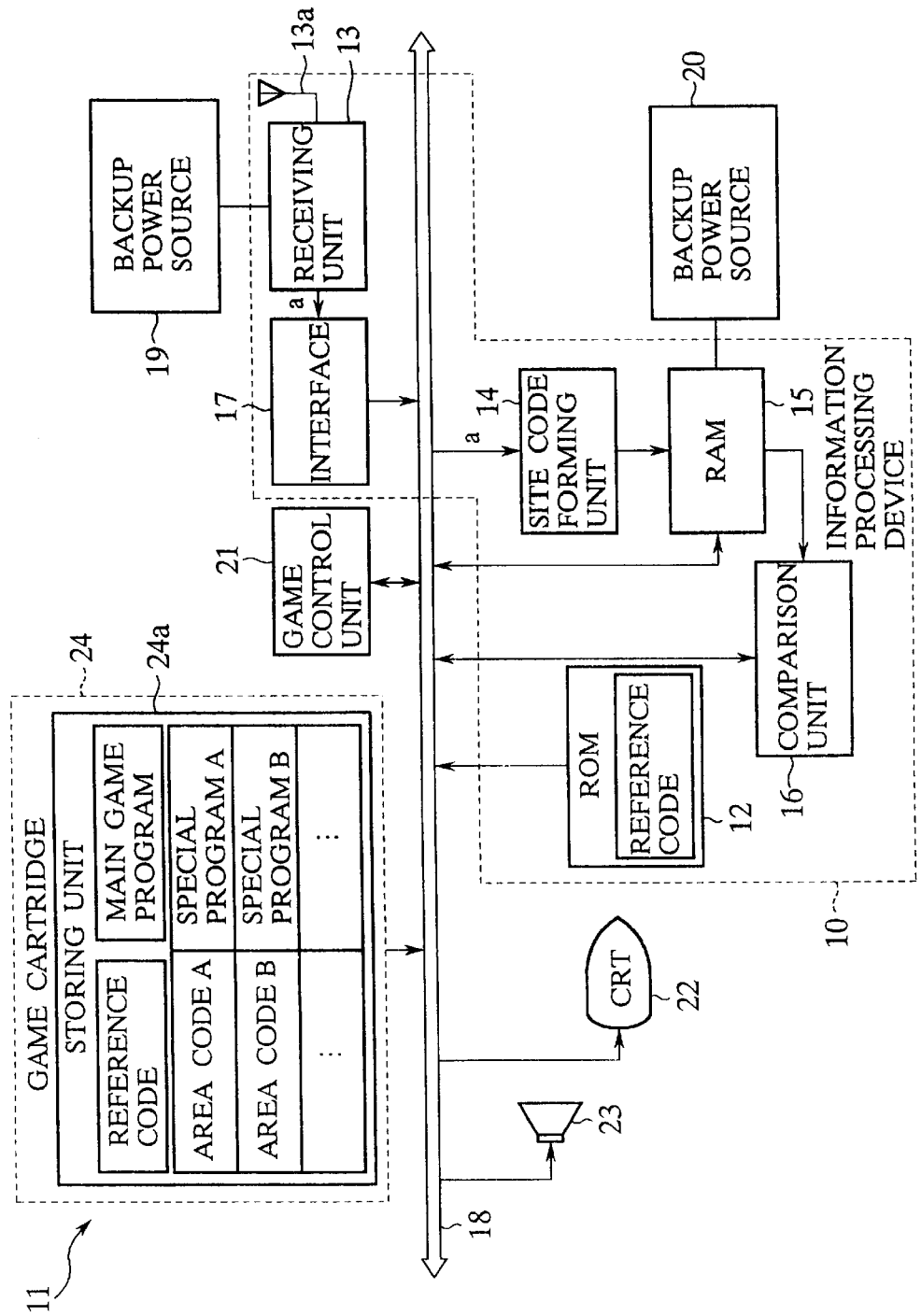
FIG. 1 is a block diagram of the video game machine including the information processing device according to a first embodiment of the present invention, which diagrammatically shows its structure.

FIG. 1 is a block diagram of the video game machine 11 which is the electric device comprising the information processing device 10 according to the present embodiment.

As shown in FIG. 1, the information processing device 10 comprises a ROM 12 storing a reference code, a receiving unit 13 of a global positioning system (GPS), a site code forming unit 14 for forming a site code, a RAM 15 for storing the formed area code, and a comparison unit 16 for comparing the reference code with the site code.

The ROM 12 stores a reference code indicative of an area which is set in advance. The preset area is an area where the use of the video game machine 11 is permitted.

A reference code identifies an area where the use of the video game device 11 is permitted, such as a specific country where the video game machine is sold, a site of a company who makes programs, or others.

The receiving unit 13 is a part of the GPS which is a current position deciding system using an artificial satellite going around the earth, and includes an antenna 13a for receiving electric waves from the artificial satellite. The antenna 13a is disposed at a location, e.g., outdoors, where the antenna 13a can receive the electric waves. The receiving unit 13 receives electric waves from the artificial satellite through the antenna 13a to obtain position measuring data "a". Based on the position measuring data "a", the receiving unit 13 can identify a position where the receiving unit 13 is located.

The receiving unit 13 is connected to a bus line 18 through an interface 17 and is connected to a site code forming unit 13 by the bus line 18. The receiving unit 13 is maintained operative by a backup power source 19.

The site code forming unit 14 includes a sub-CPU (not shown) and forms a site code, based on position measuring data "a" received by the receiving unit 13.

When the receiving unit 13 outputs to the site code forming unit 14 position measuring data "a" which has measured a current position of the receiving unit 13, the site code forming unit 14 forms a site code, based on the position measuring data "a". The formed site code indicates the current position of the information processing device 10, which is the measured point.

The RAM 15 is a read/write memory unit which stores and retains a site code formed by the site code forming unit 14. The RAM 15 retains memories by a backup power source 20.

The comparison unit 16 includes a main CPU (not shown) reads a reference code stored in the ROM 12 and a site code stored in the RAM 15 with each other. When the comparison finds both agree with each other, the comparison unit 16 outputs an actuation signal which permits actuation of the video game machine 11 as a control signal based on a comparison result. The actuation signal is inputted to the game control unit 21 through the bus line 18.

The game control unit 21 generally controls progress of a game based on a game program. Game progress information from the game control unit 21 is outputted to a CRT 22 and a speaker 23 through the bus line 18. Game images are displayed on the CRT 22 in accordance with game progress, and the speaker 23 gives out game sounds in accordance with the game progress. Operation information from an operation unit (not shown) is inputted to the game control unit 21.

A game cartridge 24 is an external memory device which can be mounted on the video game machine 11 and stores a game program. The game cartridge 24 is in advance built in the video game machine 11 for commercial uses and removably mounted on the video game machine 11 for domestic uses.

A storing unit 24a of the game cartridge 24 stores a reference code in addition to a main game program, and special programs A, B, . . . related to area codes A, B, . . .

A reference code indicates an area where the use of the game cartridge 24 is permitted and is predetermined as is the reference code stored in the ROM 12.

Special programs A, B, . . . are predetermined corresponding to respective area codes A, B, . . .

In a case that area codes A, B, . . . correspond to countries, special programs A, B, . . . are programs or others for changing a language to languages used in the countries, changing a main character to popular characters in the countries, changing a program to be suitable to the countries, etc. To be specific with a soccer game, when an area code is Argentina, a special program is for changing a soccer field to an Argentine soccer stadium and players to famous Argentine soccer players, and for more cheering more vigorously for Argentina.

In a case that area codes A, B, . . . correspond to places in Japan, special programs A, B, . . . are programs for changing a game to be suitable to the places. To be specific with a baseball game, in a case that a game player plays selects "HIROSHIMA CARPS" and plays the game, when the baseball game is played in the Hiroshima area, a special program A, B, . . . is for changing a background image to "Hiroshima Shimin Kyujo" (Hiroshima Citizen Baseball Stadium), for cheering more vigorously for "HIROSHIMA CARPS", and for making judgement standards of the judges preferential to "HIROSHIMA CARPS".

Then, the operation of the video game machine 11 comprising the information processing device 10 according to the present embodiment will be explained with the flow chart shown in FIGS. 2 and 3.

First, to actuate the video game machine 11, it is judged whether or not the power source is on or not, or whether a reset signal has been generated (Step S1). When the power source is on, or a reset signal has been generated, the game control unit 21 actuates a program in a boot ROM (not shown) (Step S2).

Next, the site code forming unit 14 forms a site code, and the formed site code is stored in the RAM 15 (Step S3). A site code which has been formed by the site code forming unit 14, based on position measuring data "a" inputted by the receiving unit 13 is supplied to the RAM 15. Based on the latter site code, a current location of a video game machine 11 including the information processing device 10 is identified.

Then, in accordance with a program stored in the boot ROM, a reference code stored in the ROM 12 included the information processing device 10 (Step S4). Based on the reference code read from the ROM 12, an area where the use of the video game machine 11 including the information processing device 10 is identified.

Next, it is judged whether or not the reference code and the site code agree with each other (Step S5). The comparison unit 16 compares the reference code read from the ROM 16 with the site code read from the RAM 15 to judge whether or not they agree with each other, and a comparison result is supplied from the comparison unit 16 to the game control unit 21.

When the comparison result given by the comparison unit 16 is that the reference code does not agree with the site code, fault processing for not actuating the video game machine 11 is conducted (Step S6).

When the comparison result given by the comparison unit 16 is that the reference code and the site code agree with each other, the comparison unit 16 outputs an actuation signal which permits the video game machine 11 to be actuated to the game control unit 21. The actuation signal inputted to the game control unit 21 actuates the video game machine 11 (Step S7). An actuation signal thus outputted by the comparison unit 16 functions as an operation permitting/non-permitting signal which permits or does not permit the video game machine 11 to operate.

Then, the video game machine 11 is actuated, whereby in accordance with a program stored in the boot RAM, a reference code is read from the storing unit 24a of a game cartridge 24 (Step S8). A reference code of the game cartridge 24 is indicative of an area where actuation of the game cartridge 24 is permitted. Based on a reference code, an area, e.g., a specific country, a site of a game program maker or others, an area where the use of the game program is permitted is identified.

Next, it is judged whether or not the reference code read from the storing unit 24a and the site code agree with each other (Step S9). The comparison unit 16 compares the reference code read from the storing unit 24a with the site code read from the RAM 15 with each other to judge whether or not they agree with each other. A comparison result is outputted to the game control unit 21.

The comparison result of the comparison unit 16 is that the reference code and the site code do not agree with each other, the fault processing for not reading a game program of the game cartridge 24 is conducted (Step S10). The fault processing disables the execution of the game program.

The comparison result of the comparison unit 16 is that the reference code agrees with the site code, the game control unit 21 outputs an actuation signal for reading the game program, etc. When the actuation signal is outputted, the game program, etc. are read from the game cartridge 24 (Step S10).

The storing unit 24a of the game cartridge 24 stores, in addition to a main game program, special programs A, B, . . . in relation with area codes A, B, . . . The special programs A, B, . . . are programs corresponding to the respective area codes A, B, . . ., and constitute in cooperation with the main program a program which is suitable to the area codes A, B, . . .

Then, it is judged whether or not the area code A, B, . . . read form the storing unit 24a agrees with the site code (Step S12). The comparison unit 16 judges which of the area codes A, B, . . . agrees with the site code read from the RAM 15 and outputs a comparison result to the game control unit 21.

When the comparison result given by the comparison unit 16 is that none of the area codes do not agree with the site code, a standard game program based on the main game program is executed (Step S13). Also in this case, basic changes, e.g., in a language used in the game program, may be made corresponding to the site code. That is, the game program language may be changed to a standard language corresponding to the site code.

When the comparison result given by the comparison unit 16 is that the site code and an area code A agree with each other, the main program is changed in accordance with the special program A corresponding to the area code A, and the game program changed suitable for the area A is executed (Step S13A). Similarly, when the comparison result given by the comparison unit 16 is that the site code and an area code B agree with each other, the main program is changed in accordance with the special program B corresponding to the area code B, and the game program changed suitable for the area B is executed (Step S13B). Thus, the game program is executed in accordance with the area codes A, B, . . .

In a case of, e.g., a baseball game, when the area code A is Hiroshima, the main game program is changed so that the background image is changed to "Hiroshima Shimin Kyujo" (Hiroshima Citizen Stadium), watchers in the game more vigorously cheer for "HIROSHIMA CARPS", and judgement standards of the judges are preferential to "HIROSHIMA CARPS", and the thus changed program for the Hiroshima area is executed. When the area code B is Nagoya, the main game program is changed so that the background image is changed to "Chunichi Kyujo" (Chunichi Baseball Stadium), watchers in the game more vigorously cheer for "CHUNICHI DRAGONS", and judgement standards of the judges are preferential to "CHUNICHI DRAGONS", and the thus changed program for the Nagoya area is executed.

It is possible that plural ones of special programs A, B, . . . are selected corresponding to an area code A, B, . . . and the selected special programs and a main game program are combine to form an area game program.

As described above, the information processing device 10 is provided int eh video game machine 11, whereby a current site of the video game machine 11 can be accurately identified. As a result, the video game machine 11 can be controlled in accordance with an area. At the same time, a current site of the game cartridge 24 can be accurately identified, whereby the game cartridge 24 can be controlled in accordance with an area.

Accordingly the video game machine 11 or the game cartridge 24 are protected from operation outside specific areas. In addition, a current side is confirmed by the GPS, whereby an operable area can be pin-pointed.

That is, site date given by the GPS is referred to a reference code stored in advance in the information processing device 10 or the game cartridge 24 to control actuation of the information processing device 10. As a result, to actuate the information processing device 10 outside an operable area, the reference code itself must be changed, which is not so easy as in the conventional devices.

Accordingly, unduly sale of the video game machine 11 and the game cartridge 24 including their export and import can be prevented, so that a party who develops and sells them are protected from disinterests.

At the same time, a game program which is unique to an area is prepared in consideration of characteristics of the area to make the game program inoperative in other areas, whereby a game device or a game program which is being development can be made inoperative outside the site of the developing company. Security can be ensured.

On the other hand, to prepare a game program unique to an area in consideration of characteristics of the area makes it possible to provide a game program which is sensitive to needs of the area and accordingly amusing.

As a result, the processing for corresponding a main game program to areas for one product does not increase in accordance with wider varieties of needs in areas and increases in numbers of countries the video game machine and the game cartridge are sold to. Furthermore, it is unnecessary to provide to each country video game machines storing area codes thereof, which does not lead to cost increases and ill inventory of the video game machine 11, etc. Furthermore, an area code for one area is not stored as a set value in the body of the video game machine 11, which allows the area to be subdivided later as required.

In addition, the RAM 15 is readable and writable, and a site code can be rewritten. Accordingly, when a video game machine 11 which is in use in a proper area where the use of the video game machine 11 is permitted is moved to a different area, the site code must be rewritten, which prevents improper export of the video game machine 11 to areas where the use of the vide game machine 11 is not permitted.

The receiving unit 13 is maintained operative by the backup power source 19, and memories of the RAM 15 are maintained by the backup power source 20. As a result, a final site code received by the receiving unit 13 can be held by the RAM 15. Accordingly it is possible to form a site code before entering indoors or other places where electric waves cannot be received from the artificial satellite, which makes the antenna unnecessary for receiving the electric waves indoors.

Figure 4:
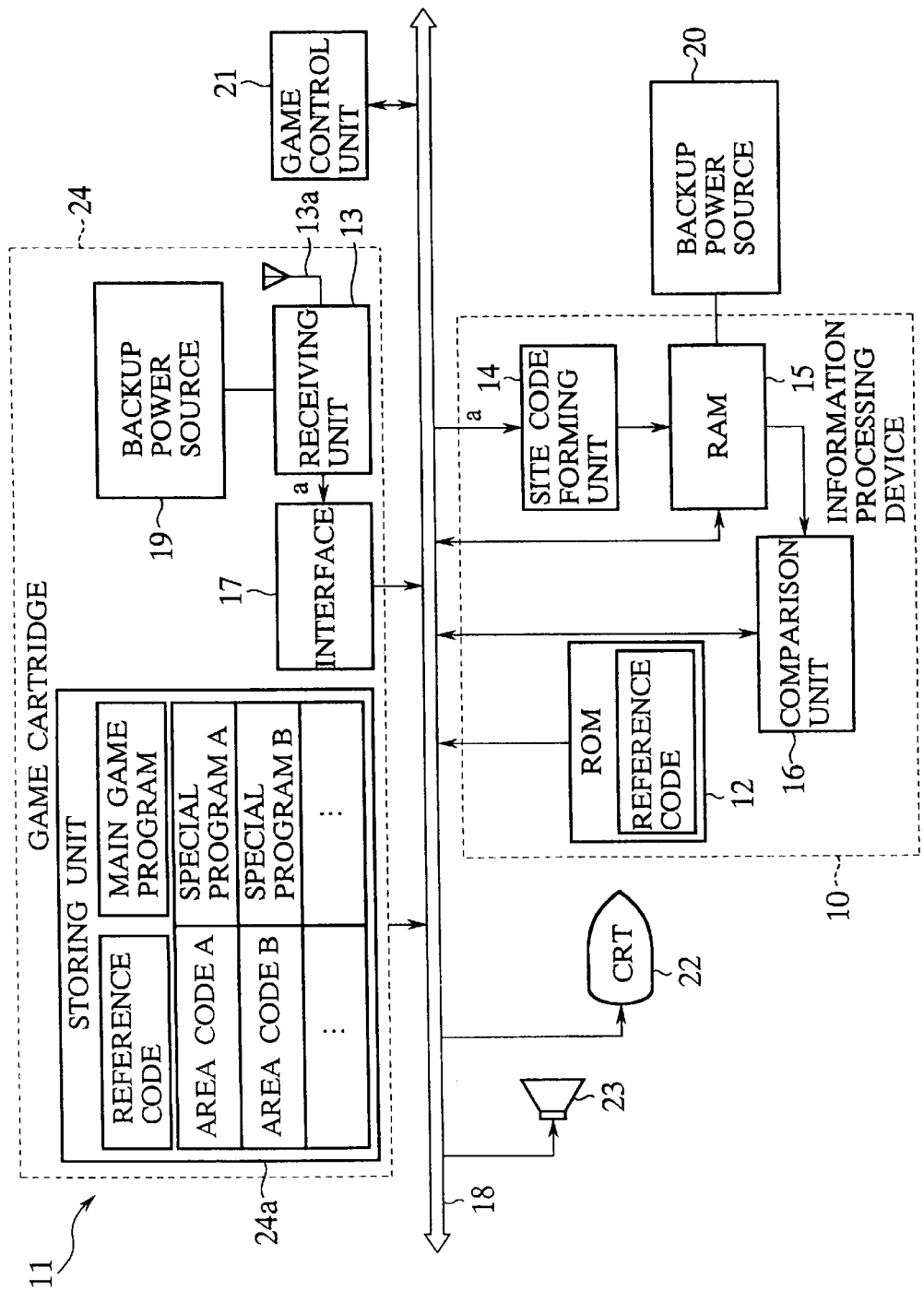
FIG. 4 is a block diagram of the video game machine including the information processing device according to a second embodiment of the present invention, which diagrammatically shows its structure.

Next, the information processing device according to a second embodiment of the present invention will be explained with reference to FIG. 4. The same members or members of the same kind of the present embodiment as those of the video game machine of FIG. 1 are represented by the same reference numerals not to repeat or simplify their explanation.

The game video machine comprising the information processing device according to the present embodiment is characterized in that a receiving unit 13 of a GPS is disposed in a game cartridge 24.

The game cartridge 24 comprises a storing unit 24a storing a main game program, a reference code, area codes A, B, . . . and special programs A, B, . . ., and a receiving unit 13 of the GPS, a receiver antenna 13a, an interface 17 and a backup power source 19.

An information processing device 10 comprises a ROM 12 storing the reference code, a site code forming unit 14 for forming a site code, a RAM 15 for storing the formed site code, and a comparison unit 16 for comparing the reference code with the site code.

Electric waves from an artificial satellite are received by the antenna 13 included in the game cartridge 24. The receiving unit 13 receives the electric waves from the artificial satellite to obtain position measuring data "a" and outputs the position measuring data "a" to a bus line 18 through the interface 17. The site code forming unit 13 of the information processing device 10 receives the position measuring data "a" through the bus line 18 and forms a site code, based on the position measuring data "a". The formed site code is indicative of a current position of the information processing device 10, a measured position.

According to the present embodiment, the GPS is included in the game cartridge 24, whereby a game using position measuring data given by the GPS can be played on a conventional video game machine without the GPS.

Figure 5:
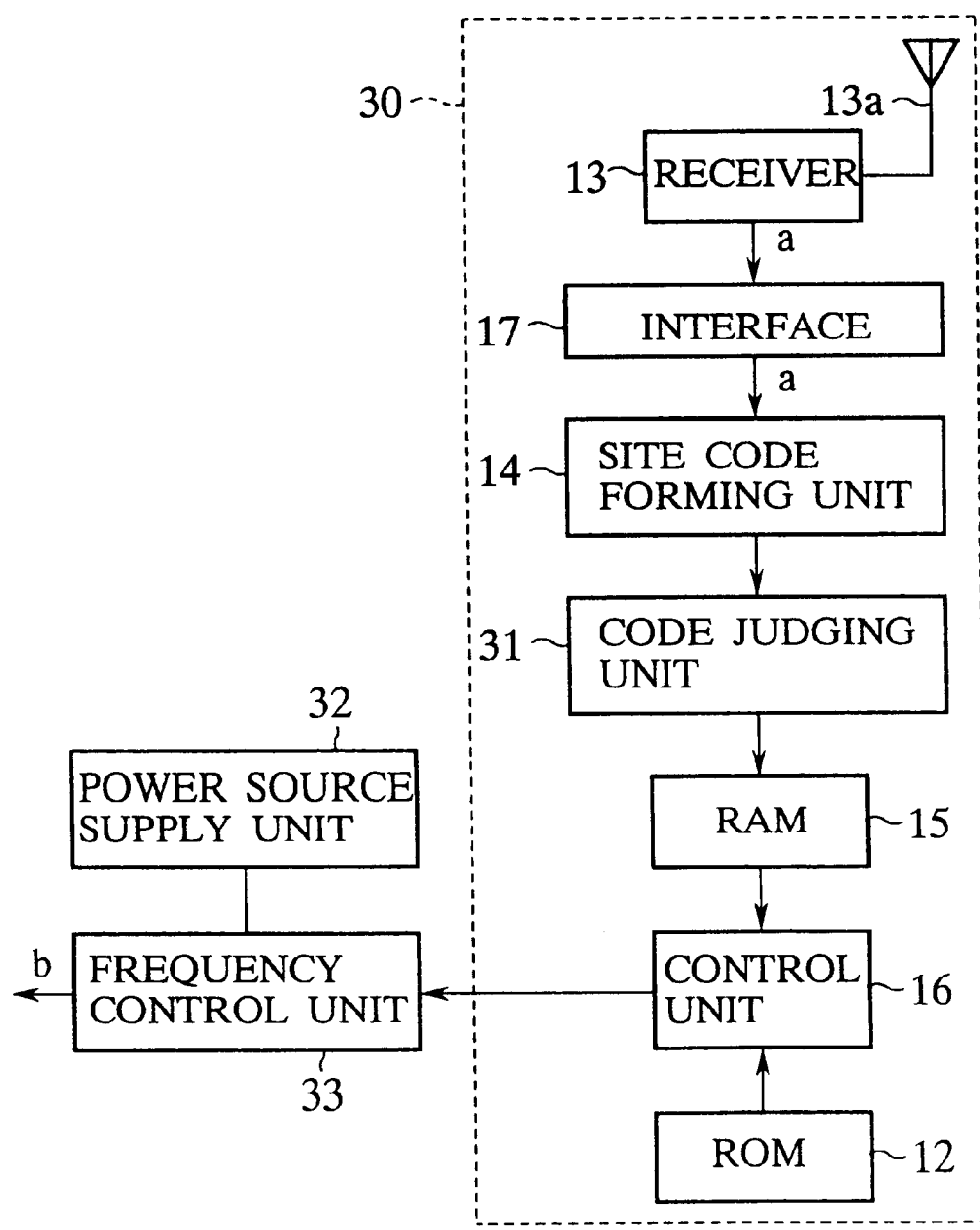
FIG. 5 is a block diagram of the video game machine including the information processing device according to a third embodiment of the present invention, which diagrammatically shows its structure.

Then, the information processing device according to a third embodiment of the present invention will be explained with reference to FIG. 5. FIG. 5 is a block diagram of the information processing device 30 according to the present embodiment.

The information processing device 30 has the same constitution and function as the information processing device 10 except that the former 30 includes a code judging unit 31 and outputs frequency control signals in place of actuation signals.

The code judging unit 31 judges whether or not a site code formed by a site code forming unit 14 is proper, and only when the code judging unit 31 judges a site code proper, the site code is written in a RAM 5. The judgement as to a site code is conducted based on whether or not the site code is discriminable among codes.

A control unit 16 outputs, based on a site code, a frequency control signal corresponding to a frequency of an a.c. power source at the site.

The information processing device 30 is provided in an electric device (not shown) which is required to accommodate two kinds of a.c. source power. Areas where the electric device is used are an area where a 50 Hz a.c. source power is supplied and an area where a 60 Hz a.c. source power is supplied.

As shown in FIG. 5, the electric device includes a frequency control unit 33 which switches a corresponding frequency of 50 Hz or 60 Hz in accordance with a frequency of an a.c. electric source power supplied by a power source supply unit 32. The electric device is operated by a.c. source power outputted through the frequency control unit 33.

Then, the operation of the information processing device according to the present embodiment will be explained.

First, in an operation of the electric device, the site code forming unit 14 forms a site code, based on position measuring data "a" from the receiving unit 13. The formed site code is outputted from the site code forming unit 14 to the code judgement unit 31.

Subsequently, the code judgement unit 31 judges whether or not the inputted site code is proper. only when the judgement result is proper, the site code is written in the RAM 15.

Then, the control unit 16 outputs to the frequency control unit 33 a frequency control signal based on the site code. In response to the frequency control signal, a corresponding frequency of the frequency control unit 33 is switched in accordance with the site code.

Then, the electric device is operated by a.c. power "b" inputted from the power source supply unit 32 through the frequency control unit 33.

Thus, the information processing device 30 included in the electric device enables a current position of the electric device to be accurately identified. As a result, in a case that there are a 50 Hz a.c. source power area and a 50 Hz source power area, the electric device can have the part related to the power source made applicable to either areas for sale. That is, one kind of product is applicable to a plurality of areas of different frequencies. Accordingly it is not necessary to make the electric device different in accordance with areas.

It can be judged by the code judging unit 31 whether or not an inputted site code is proper. Accordingly when electric wave receiving condition of the receiving unit 13 is not good, writing of an improper code can be prevented. Thus, a.c. source power of different frequencies can hinder the electric device from operation.

The present invention is not limited to the above-described embodiment and can cover other various modifications.

For example, in the first to the third embodiments, the information processing device 10, 30 are applied to the video game machine 11 and the electric device using different a.c. source power, but is applicable to various electric devices. Various electric devices which must correspond to respect areas include the information processing device 10, 30 to thereby accurately grasp current positions.

In the first and the second embodiments, the external storage device may be storage mediums other than the game cartridge 24, such as CD-ROM for games or others.

In the first and the second embodiments, the backup power source 19 for the receiving unit 13 and the backup power source 20 for the RAM 15 may be a single backup electric source.

In the first and the second embodiments, no reference code may be stored in the ROM 12 and the game cartridge 24. It is possible that without using the security check by the use of the reference code, simply a site code is compared with an area code, and in accordance with a comparison result, an areal game program is executed.

In the third embodiment, the code judging unit 31 of the information processing device 30 may be disposed in the information processing device 10.

In the third embodiment, the ROM 12 for storing a reference code may not be disposed in the information processing device 30.

INDUSTRIAL APPLICABILITY

The present invention is suitable for electric devices which are sold in a plurality of areas, especially in a plurality of countries, more specifically to electric devices which require changes for making the electric devices agreeable to situations of the areas and the countries.

What is claimed is:

1. A game device comprising:

a game control unit for executing a game program; and an information processing device, said information processing device comprising:

a reference code storing unit which stores a reference code indicative of a predetermined area;

a site code forming unit which, based on position measuring data obtained by a positioning system, forms a site code at a measuring point;

a control unit which outputs a predetermined control signal based on the site code formed by the site code forming unit; and a comparison unit which compares the reference code stored in the reference code storing unit with the site code formed by the site code forming unit to output a comparison result, wherein an external storage device to be mounted on the game device stores a plurality of area codes, and special programs associated with said plurality of area codes, and wherein the game control unit executes at least one of the special programs, based on the comparison result given by the comparison unit.

2. The game device of claim 1, wherein said information processing device further comprises a site code storing unit which stores and retains the site code formed by the site code forming unit.

3. The game device of claim 2, wherein said information processing device further comprises:

a holding power source which holds memory of the site code storing unit; and an operational power source which operates the positioning system which provides the position measuring data.

4. The game device of claim 3, wherein said information processing device further comprises a code judging unit which judges whether or not the site code formed by the site code forming unit is proper.

5. The game device of claim 1, wherein the comparison unit of the information processing device compares the site code with said plurality of area codes.

6. The game device of claim 1, wherein said external storage device stores a game program to be executed by the game device, and a reference code to be compared with the site code by the comparison unit of the information processing device.

7. The game device of claim 1, wherein said external device further comprises a receiving unit of said positioning system.

* * * * *